United States Patent

Page

[15] 3,702,006

[45] Oct. 31, 1972

[54] METHOD FOR BALANCING THE UTILIZATION OF INPUT/OUTPUT DEVICES

[72] Inventor: Josiah B. Page, Salt Point, N.Y.

[73] Assignee: International Business Machine Corporation, Armonk, N.Y.

[22] Filed: June 9, 1971

[21] Appl. No.: 151,452

[52] U.S. Cl. ....................................................444/1
[51] Int. Cl. ..............................G06f 3/04, G06f 9/19
[58] Field of Search ..........................................444/1

[56] References Cited

OTHER PUBLICATIONS

" Analysis of Computer Peripheral Interface," By John Staudhammer, C. Combs, & G. Wilkinson, Proceedings of 22nd National Conference of the Association for Computing Machinery, 1967, pp. 97–101.

" A System Organization for Resource Allocation," By D. Dahm, F. Gerbstadt, & M. Pacelli, Communications of the ACM, Vol. 10, Issue 12, December 1967, pp. 772–779.

*Primary Examiner*—Gareth D. Shaw
*Attorney*—Hanifin and Jancin and D. R. McKechnie

[57] ABSTRACT

During the operation of a data processing system capable of multi-tasking, a count is made of the number of times each I/O device is accessed by each task. The counting is done over the time interval between successive allocation routines. During each allocation, an analysis is made using the count and time interval to estimate the utilization of each device due to the current tasks. An estimate is also made of the anticipated utilization due to the task undergoing allocation. The estimated current and anticipated utilization are then considered and an attempt is made to allocate data sets to the least utilized I/O devices so as to achieve balanced I/O activity.

23 Claims, 10 Drawing Figures

INVENTOR
JOSIAH B. PAGE

BY Douglas R. McKechnie
ATTORNEY

METHOD FOR BALANCING THE UTILIZATION OF INPUT/OUTPUT DEVICES

BACKGROUND OF THE INVENTION

1. Field of the Invention

This invention relates to the operation of a data processing system and, more particularly, to a method for balancing the utilization of input/output (I/O) devices.

2. Prior Art

As is known, a critical factor affecting the performance of a data processing system is the I/O activity. This factor is, in turn, dependent on many other factors including the distribution of data sets or files among the various I/O devices. The need for balanced I/O activity is especially evident in larger systems operating in a multi-programming environment. In such systems, any imbalance of the I/O activity results in an inefficient use of system resources, that is some devices may not be used while others are overused, and it also results in a system performance degradation where the various programs must wait upon the overused devices or channels.

The term "I/O subsystem" is used herein to refer to the collection of all channels, channel paths and I/O devices making up a specific system configuration. While end use devices such as card readers, printers, etc. are included in this definition, the invention is principally concerned with selector channels and auxiliary storage devices such as magnetic disks, drums and tapes. To a large degree, the I/O subsystem operates asynchronously with respect to the CPU. This permits data to be accessed and moved between auxiliary storage and main storage while the CPU is busy executing active tasks. This overlap capability between the CPU and the I/O subsystem contributes significantly to the system throughput performance. In addition, most of the components making up the I/O subsystem also operate asynchronously with respect to each other. Their overlap capability is also important. Hence, it means that time consuming events, such as access mechanism positioning on a movable head direct access device, can be overlapped with the transfer of data through channels. For an operating system to take maximum advantage of these asynchronous I/O subsystem capabilities, some means must exist to control the distribution of the utilization across different I/O resources so as to have balanced I/O activity. The operating system is afforded the opportunity to affect the distribution of I/O activity whenever it must choose which I/O devices should be allocated to satisfy a jobs' requirements.

Prior art operating systems have achieved some degree of balanced I/O activity. An example of one such system is the IBM System/360 operating system (OS/360) operating with a multi-programming with a variable number of tasks (MVT) configuration. As is known, in such systems, the selection of an I/O device for assignment to a data set is essentially a process of elimination. The selection process is done by the job management portion of the MVT control program. The selection process first involves selecting units where there is no choice by a demand allocation routine. If all requests for I/O devices are satisfied by this demand allocation routine, control is passed to a TIOT construction routine. If not, the process of elimination is continued by a decision allocation routine. This routine allocates units to all unallocated data sets requiring private volumes or specifying volume serial numbers, to data sets passed by a previous step or requiring retained volumes (if the volumes are mounted) and to any other data sets whose eligible units are reduced to the point where a choice no longer exists. At the completion of the decision allocation routine, units are assigned or have been assigned to all requests except those involving public volume space. Processing of requests for public volumes is continued in the TIOT construction and space request routines. It is within this latter routine that the existing OS/360 MVT has achieved some degree of balanced I/O activity. The existing algorithm for doing this is designed to balance the number of data sets allocated to each of the I/O subsystems asynchronous resources. The variable being controlled is the distribution of allocated data sets and it is essentially an independent variable of the I/O subsystem operation. The principal drawback is that data sets are used to varying degrees and the balanced distribution of data sets does not account for the wide variances in the usage of the data sets.

SUMMARY OF THE INVENTION

The objective of controlling I/O subsystem operation suggests a need for selecting a variable that measures what it is to be controlled. There are three variables which might be selected, I/O load, the number of bytes transferred and I/O utilization. Each of these three variables measures I/O subsystem operation and, as a result are directly related so that a change in any one variable will signify a reasonably proportionate change in the other two. The I/O load is perhaps the variable most commonly associated with controlling I/O subsystem operation and it refers to the rate of demand for an I/O resource. However, the I/O load is extremely complicated when I/O requests are queued up and are then not handled on a first in, first out basis so that consideration should be made of such factors as queue lengths, intervals between arrival times, the time in the queue and service time. Because so many time dependent variables are functionally related within the concept of load, it is more profitable to concentrate on the effect that load is having on the system's resources rather than on the load itself. The number of bytes transferred is another variable which measures the effect of load, but the overhead required to monitor this variable is prohibitively expensive. Thus, the variable "I/O resource utilization," which measures the effect caused by load, was selected as the variable that provides a measure of what is to be controlled.

Accordingly, one of the objects of the invention is to provide improved systems performance by achieving an improved balancing of I/O activity.

Another object of the invention is to use the I/O utilization variable as a means for balancing I/O operations.

Another object is to provide a system for monitoring operation of the I/O subsystem and to allocate new data sets to devices in dependence on information derived from the monitoring activity.

Still another object is to control the I/O allocation according to information on utilization derived from a measurement interval immediately preceeding the allocation.

A further object is to achieve I/O balancing without the need for any special hardware monitoring devices.

Another object is to allocate data sets to I/O devices during the initiation of a task in accordance with I/O events measured over a time period immediately preceeding the allocation and with the I/O load estimated to be due to the task.

Briefly, in accordance with the invention, the operating system of a data processing system counts the number of I/O events over a time interval. When a data set is to be allocated to one of a plurality of I/O devices to which it is capable of being allocated, use is made of the count and of the time interval to determine which device is utilized the least and to allocate a data set in accordance with this determination.

DESCRIPTION OF THE DRAWINGS

The foregoing and other objects, features and advantages of the invention will be apparent from the following detailed description of a preferred embodiment of the invention, as illustrated in the accompanying drawings wherein.

GENERAL DESCRIPTION

While it should be apparent to those skilled in the art that the invention is applicable to other operating systems, it was specifically designed in connection with the OS/360 MVT and so it will be described in connection therewith. Such system is publicly available and is described in numerous publications to which reference may be had for details. Inasmuch as the principal part of the invention is incorporated within the job management portion of the control program of OS/360, particular reference may be had to the publication, "IBM System/360 Operating System, MVT Job Management Program Logic Manual," Form GY28–6660–6, Copyright 1971, by IBM, and to the references cited therein.

Figure 1:
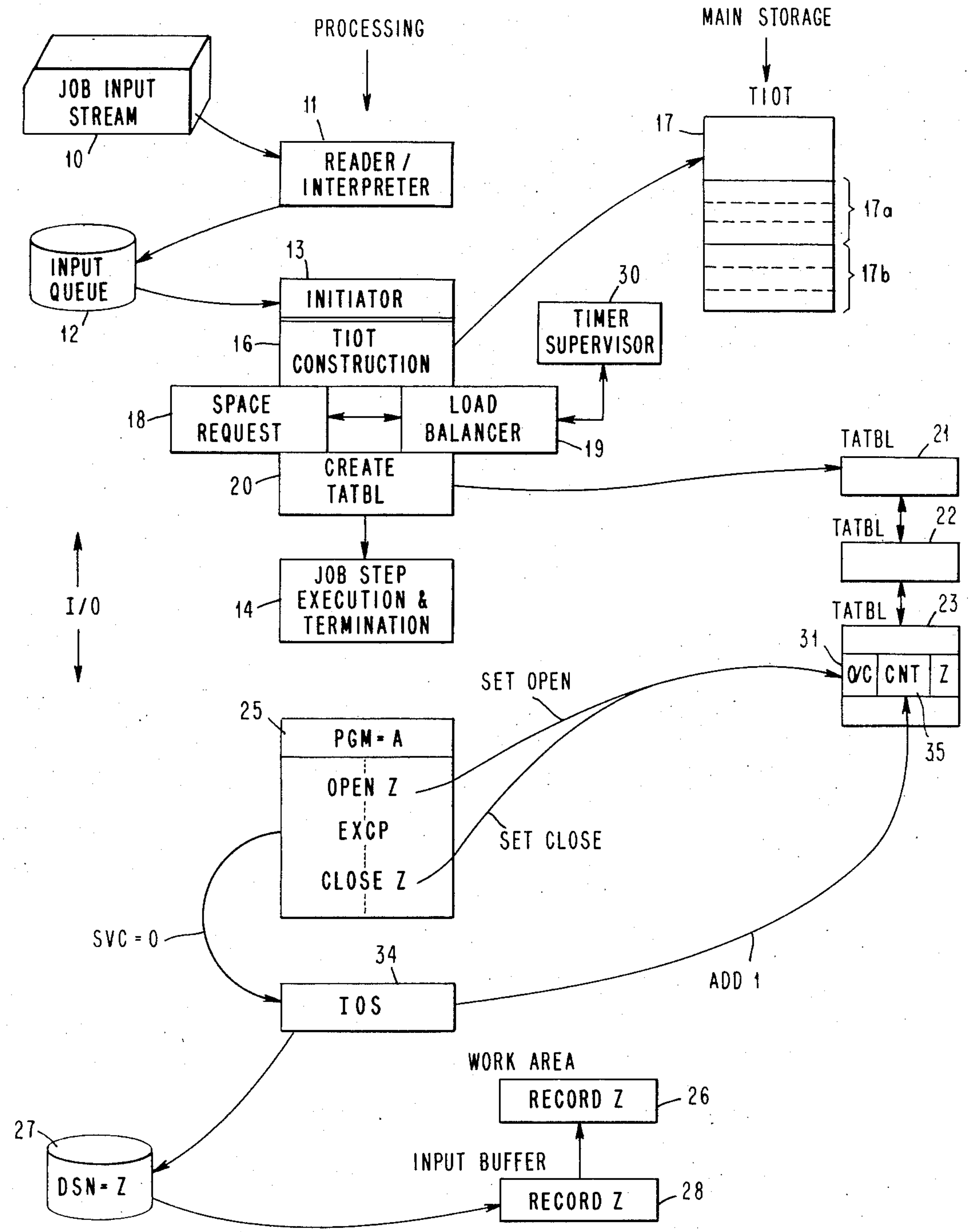
FIG. 1 is a processing diagram of a data processing system embodying the invention.

Referring now to the drawings, FIG. 1 illustrates the general relationship of the invention to the prior art. This figure is divided so that those functions representing I/O activity are at the left, those functions that involve processing, that is, the execution of either problem or control programs by hardware including a CPU, are in the center and certain data areas as they appear in main storage are shown to the right. In order to better understand the invention, the general operation of the system, which is common to both the prior art and the subject invention, will now be described.

Jobs are read into the system from a job input stream 10 by a reader/interpreter 11. The general functions of this processor are to read records from input stream 10 and the procedure library, to scan control statements and convert them to internal text, to build tables from the internal text and create input queue entries therefrom, to place messages from the operating system to the programmer in a system output queue entry, to assign space in the output queue entries for pointers to system output data sets, to write system input data records to an intermediate direct access device and place pointers to a jobs system data input set in its input queue entry, and to enqueue the jobs on an input queue 12 in accordance with the priority specified for the job.

An initiator 13 is started at the issuance of a START command by the operator. Initiator 13 selects the highest priority job from the first of input queues in 12 and either waits if no entry is yet enqueued or if there is a queue entry, dequeues it. Afterwards, initiator 13 handles the scheduling of each step of the selected job in turn. For each step, initiator 13 obtains a region of main storage, allocates I/O devices, and passes control to the first problem program involved in the job step. Thereafter, in 14, the job step is then executed. After execution, control is returned to a job management component which handles termination of the job step.

The I/O device allocation process or routine or prior art is the principal point of modification for incorporation of the invention. As is known, the I/O requirements of job steps are specified in DD (data definition) control statements included in the input stream. Each DD statement is an I/O request and specifies the attributes and device and volume requirements of a data set. The interpreter reads these requests, translates them into tabular format and places the tables in input queue 12. The tables are the input data for the I/O device allocation routine which is a subroutine of the initiator. In accordance with the prior art, initiator 13 has an I/O device allocation routine that includes a TIOT construction routine 16 the general purpose of which is to construct a TIOT (task input/output table) 17. While this table has several entries, the ones of principal interest to this invention are the list of units eligible for allocation to the data set. Thus, in FIG. 1, two fields 17A and 17B each represent a list of three I/O devices available for allocation to two different data sets, there being one list for each data set.

After the TIOT construction routine 16 is complete, the I/O device allocation routine enters into a space assignment routine which includes a space request routine 18. This routine interacts with a load balancer routine 19 shown in detail in FIG. 2, and the result of the interaction will be to assign eligible devices to the requested data sets so as to achieve a balanced load on the I/O devices, in accordance with the routine described in detail hereafter. Load balancer 19 interacts with the OS/MVT timer supervisor 30 to obtain time stamps and intervals for calculating rates associated with I/O activity. After completion of the space request routine 18, then the space assignment routine further includes the step 20 of creating a TATBL (task activity table). The TATBL, described in detail hereafter, is constructed on the basis of one for each task and it includes an entry for each data set associated with a task specifying certain information relative thereto. Since the operating system supports multitasking, it will generally be the case that, at the time step 20 is performing its function, other problem program tasks are concurrently executing. Thus, for example, TATBL's 22 and 23 already exist and when step 20 completes, it will have added TATBL 21 to the chain of TATBL's. The principal use of a TATBL is to contain data gathered during execution of the associated problem program by the monitoring function, as will now be described. At the time each TATBL is constructed, a pointer to its location is also constructed and used by the supervisory program for later access thereto.

In order to understand the monitoring function, let us assume that a problem program task 25 is in the process of executing program A. Let us also assume that it is desired to read a record from a data set Z into a work area 26 associated with program A. To do this, when program A is written, three system macros are used, the OPEN macro to open the data set, an EXCP (execute channel program) macro to cause the record to be read from device 27 on which the record is located into an input buffer area 28 and then into work area 26, and a CLOSE macro. It is to be understood that for the purpose of simplicity, in FIG. 1, these macros have been shown in their unexpanded form. In task 25, these macros have been expanded into the appropriate series of machine instructions.

The manner in which the amount of I/O activity is measured will now be described. When an EXCP is executed, IOS (Input/Output Supervisor) 34 is invoked by the supervisor call SVC=0, in accordance with the prior art. IOS 34 is modified so as to add one to a count field associated with the task and with the data set so that each time the data set is accessed by a particular task, the count field is incremented. This count is used by load balancer 19 to calculate the device utilization in the manner described below. To better understand this counting, refer to the example shown in FIG. 1. As indicated previously, each TATBL has certain I/O activity information associated with each data set used by the task. For a purpose of this general example, some of the information has been eliminated from FIG. 1 but is described below. Thus, TATBL 23 created during the allocation routine associated with the initiation of program A, includes an entry associated with data set Z. The entry includes a first field 31 which is an open/close bit set during the execution of the OPEN and CLOSE macros to reflect the appropriate condition. It also includes a count field 35. Each time IOS 34 is invoked to access a data set Z, a one is added to this count field.

DETAILED DESCRIPTION

Tables

Load balancer 19 uses a number of tables. These tables are described, not in terms of their exact bit or byte structure, but in terms of the logical information or data they contain.

LCTBL (logical channel table) — This is a permanent table containing one entry for each logical channel recognized by the IOS. Each entry contains the following information:

| Field Number | Field |
|---|---|
| 1 | Number of allocated but unopened tape data sets |
| 2 | Number of physical channels in logical channels |
| 3 | Index in PCTBL of best physical channel |

PCTBL (physical channel table) — This table contains one entry for every physical selector channel. The fields of each entry are:

| Field Number | Field |
|---|---|
| 1 | Utilization of channel |
| 2 | Channel utilization figure for calculating channel component figure of merit |
| 3 | Channel component of figure of merit |
| 4 | Flag — field 1 changed at last PCTBL update |

DADTBL (direct access device table) — This is a permanent table containing one entry for each device in the system. The fields for each entry are:

| Field Number | Field |
|---|---|
| 1 | Total EXCP rate for device |
| 2 | EXCP rate of most accessed data set |
| 3 | Standalone seek utilization |
| 4 | Channel connect utilization |
| 5 | Figure of merit |
| 6 | Work area — number of allocated but not open data sets before handling first entry from space request. Thereafter index in device entry in TIOT if this device is a candidate. |
| 7 | Index in LCTBL |
| 8 | Index in DDTBL |

TATBL (task activity table) — As previously indicated, this table is created on the basis of one table for each task in the system and all the tables are chained together. It contains one device entry (fields 3–13) for each DD for which there is a DD entry in the corresponding TIOT except for DD's for end use devices. Its fields are:

| Field Number | Field |
|---|---|
| 1 | Length of TATBL |
| 2 | Address of next TATBL or 0 if last |
| 3 | Ever open bit |
| 4 | Open now bit |
| 5 | Seen bit |
| 6 | DASD or tape |
| 7 | Read bit |
| 8 | EXCP bit |
| 9 | Pointer to DADTBL for DASD or LCTBL for tape |
| 10 | Bit for last device entry |
| 11 | Bit for last entry in table |
| 12 | I/O event counter (field **35** in FIG. 1) |
| 13 | Multi-use field — if data set was open since last execution of routine **19**, this field contains time stamp of the time of last execution. If data set is open and was open at last execution of routine **19**, the field contains a conversion factor which when multiplied by the EXCP rate will produce the product of channel connect utilization. At other times, this field has no significance. |

DDTBL (device dependent table) — This table is a permanent table containing conversion factors appropriate to each type of device. Its entries for each device are:

| Field Number | Field |
|---|---|
| 1 | Average control unit utilization due to one access to this device type when read or write is not known |
| 2 | Anticipated utilization resulting from accesses to one data set on this device type |
| 3 | Average device utilization due to one inter-data set standalone seek |
| 4 | Average device utilization due to one intra-data set standalone seek |

Preferred values for actual typical I/O devices are:

| DDTBL1 | DDTBL3 | DDTBL4 |
|---|---|---|

| | | | |
|---|---|---|---|
| IBM 2400 series tape drives | 16 | 0 | 0 |
| IBM 2311 disk storage drive | 30 | 75 | 18 |
| IBM 2314 direct access storage facility | 25 | 75 | 15 |
| IBM 2303 drum storage | 26 | 0 | 0 |
| IBM 2301 drum storage | 15 | 0 | 0 |

WORKTABLE — Its entries are:

| Field Number | Field |
|---|---|
| 1 | Time of last allocation |
| 2 | Measurement interval |
| 3 | Total EXCP rate of all currently opened data sets |
| 4 | Total open data sets seen by PROCECO4 |
| 5 | Total tasks currently doing I/O |
| 6 | Total entries in current TIOT |

In the following description, these fields are sometimes referred to by simply specifying table name and field number, e.g., DADTBL3.

Flowchart

Figure 2A:
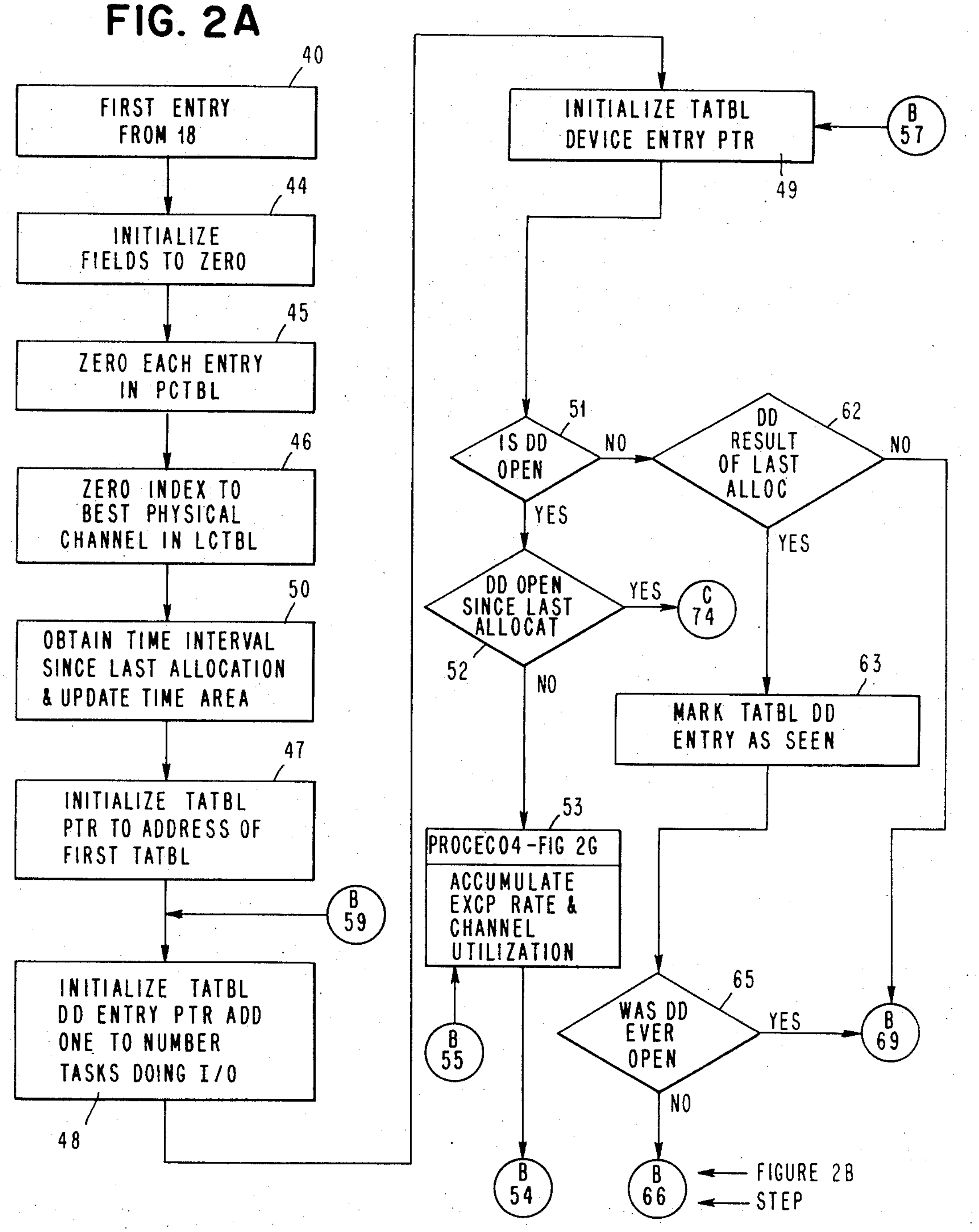
FIGS. 2A–2I form a flowchart illustrating details of the method for achieving load balancing in accordance with the invention.
Figure 2B:
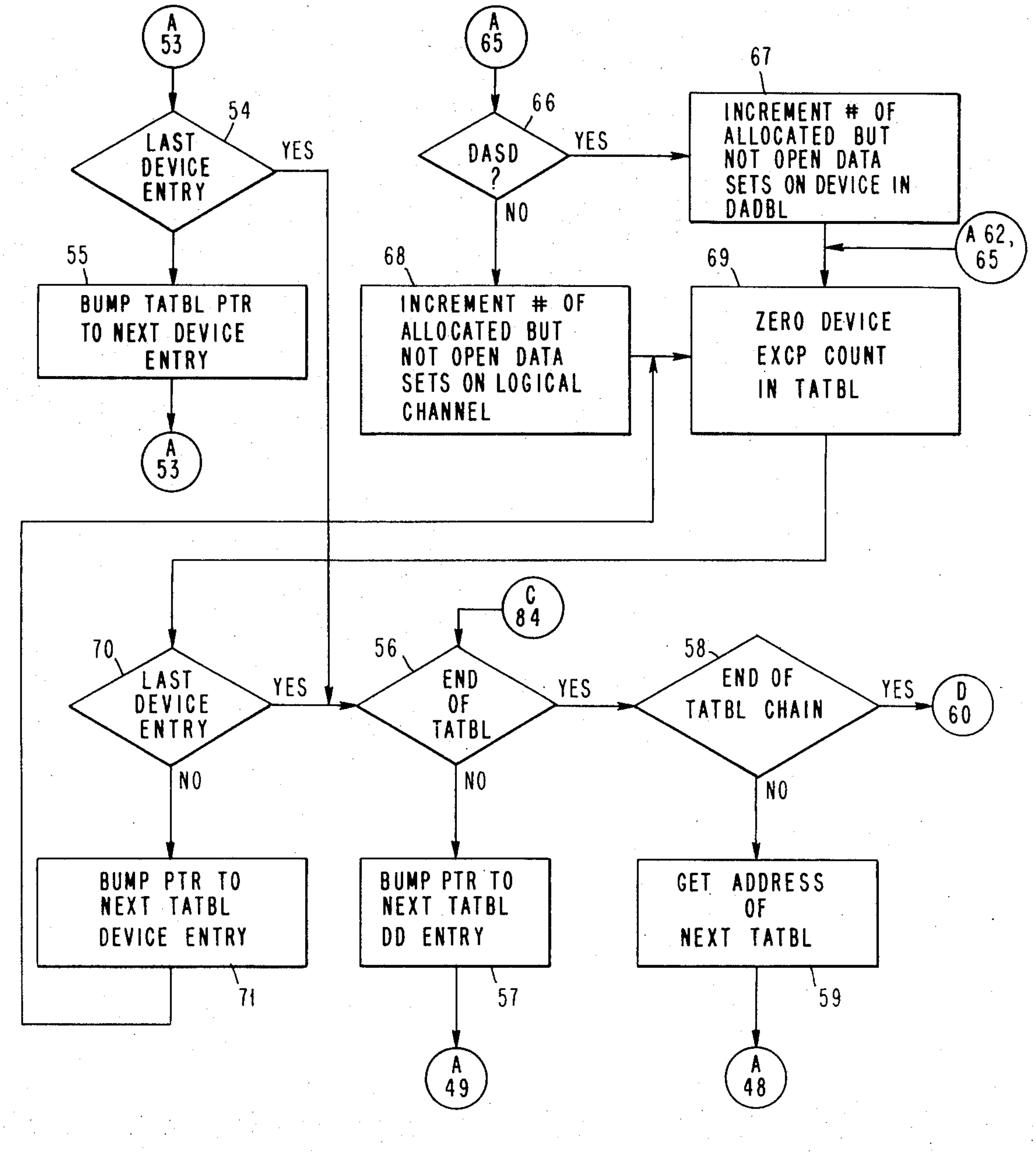
Figure 2C:
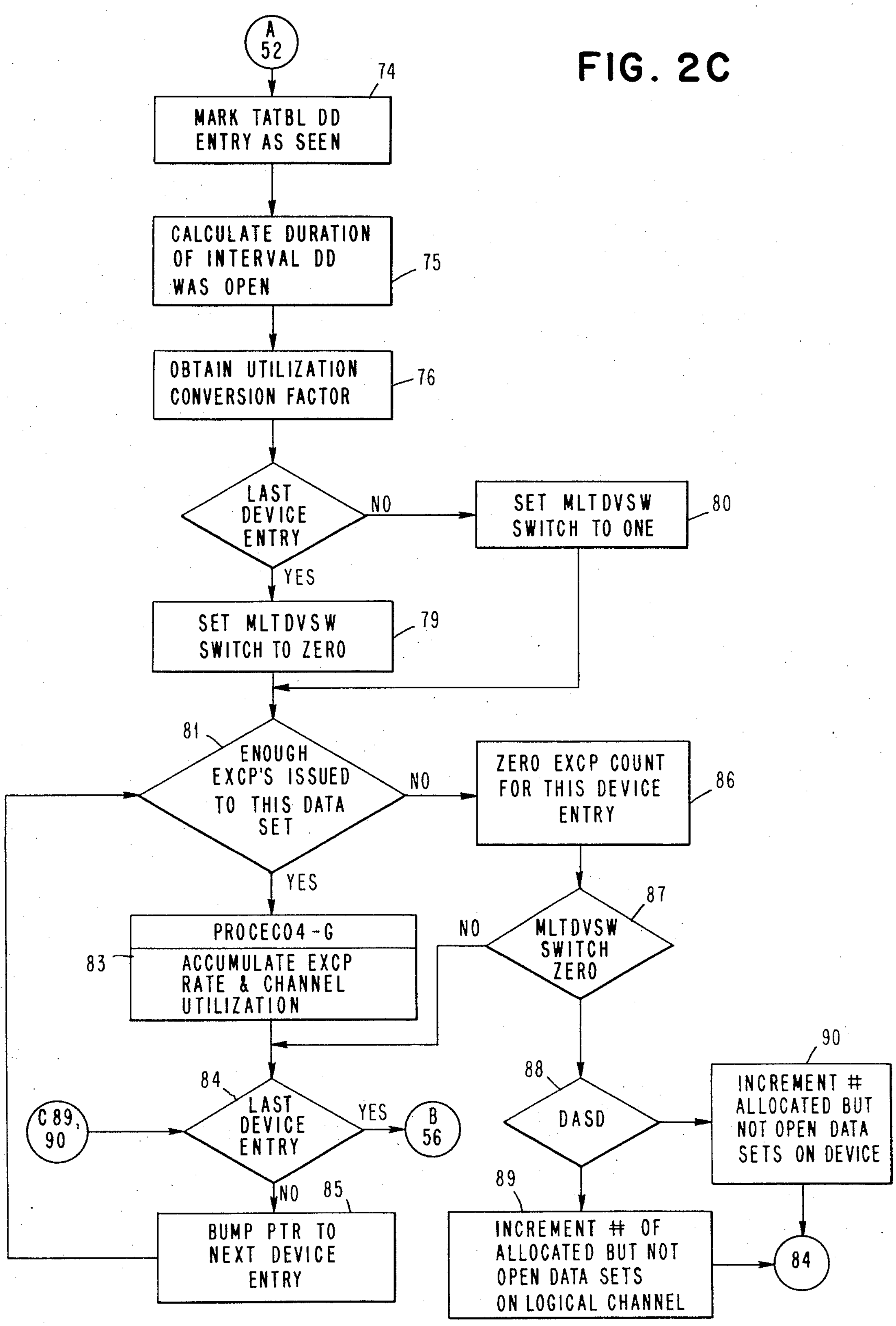
Figure 2D:
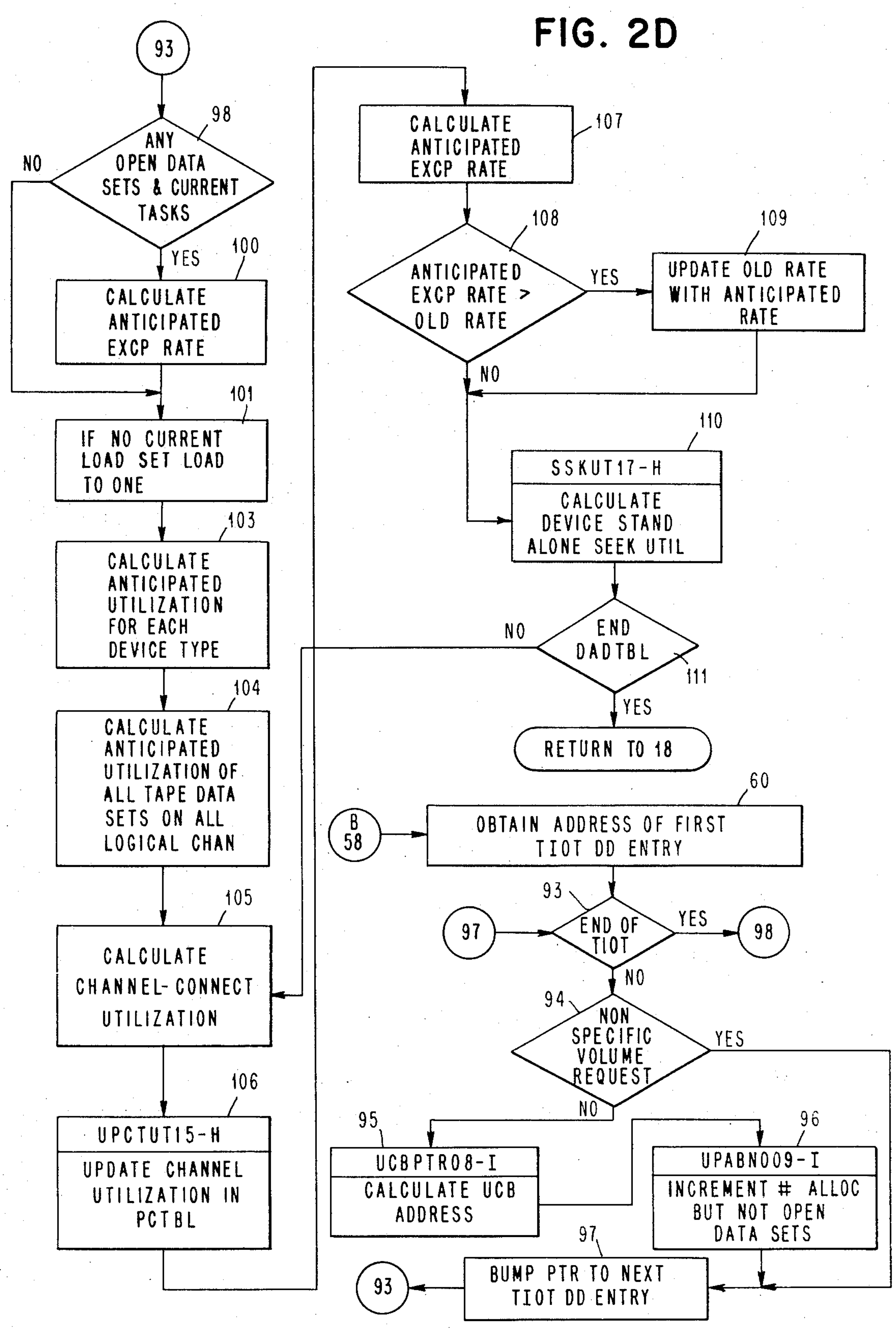

Before proceeding with the detailed discussion of the flowchart, an explanation of some symbology used in the flowchart will be made. With reference to FIG. 2A, flowchart connectors in the forms of circles are used throughout. With reference to the connector below step 65, the upper figure therein is the alphabetical suffix of the figure number showing where the corresponding connector is located. Within this particular example, the B indicates that FIG. 2B contains the mating connector. The number or numerals beneath the alphabetic character refers to the step or steps within that figure where mating connectors can be found. Thus, in the explanatory example, the mating connector would be found at step 66 in FIG. 2B. If we go to this mating connector in FIG. 2B, then we find that it refers back in a similar manner to step 65 coming from FIG. 2A. If the connector is an on-page connector, it merely has the step number showing where the flow comes from or proceeds to. Certain boxes such as step 53 in FIG. 2A also are used to reference sub-routines shown elsewhere in the drawing. The box contains a heading indicating the sub-routine name and it further contains an alphabetical character indicating the alphabetic suffix of the figure number. Thus, in step 53, the G indicates that the details of the procedure are shown in FIG. 2G.

Load balancer 19 is incorporated within the allocation subroutine of initiator 13 in order to achieve better I/O load balancing. Load balancing is achieved only in connection with DD requests that are temporary, non-specific space requests which do not specify split affinity or suballocation, these being handled by the existing prior art routines. As previously indicated, the TIOT construction routine 16 provides a candidate list, for each request, of all eligible units which can satisfy a request. Space request routine 18 tries to obtain the requested space by trying each candidate on the list in turn until the request is satisfied. The purpose of load balancer 19 is to use the monitored I/O activity data to analyze the status of the system and, based on a wide range of criteria, determine the order in which the candidate list entries will be tryed. The underlying principle of routine 19 is to use all available information to estimate the anticipated I/O load that will exist in the immediate future on every I/O resource and, based on this analysis, select the least utilized subset of the systems resources that will satisfy a space request. An attempt is then made to obtain space on that subset or unit. When space has been obtained, the anticipated load due thereto is factored into the total load analysis and, based on this additional information, the next space request is processed. This process continues until all space requests have been satisfied.

"Load" is equivalent to the proportion of time an I/O resource is busy. Without having to use any direct load measurement devices, the load or anticipated load can be estimated using a function which includes variables that correlate closely with the actual load. For concurrently executing tasks, it is possible to count such IOS events as the occurrence of EXCP's. Such events provide an accurate picture of the relative load of currently open data sets. For tasks that have just begun, as well as already allocated data sets in the step currently in allocation, the only information available is the distribution of allocated data sets. The two sources, that is the count of IOS events for open data sets and the allocated data set distribution for tasks which will, but as yet have not, start to load the I/O resources, are the basis on which the anticipated load is calculated. To improve the anticipated load estimate, such other factors as device dependent loading characteristics, standalone seek overhead for devices with movable heads and the relative load limiting effects of a device, as opposed to the channel it is connected to, are considered. Where multiple paths exist to the same device, this factor may also be considered but is not described herein.

Load balancer 19 is a routine or subroutine which forms a part of and is entered from space request routine 18 at four points 40–43, respectively shown in FIGS. 2A, 2B, 2E and 2G. Routine 18 branches and links to entry 40 shortly after routine 18 is initially entered. Load balancer 19 then principally initializes the DADTBL with I/O activity data about the current load and data about already allocated DD's in the step currently being initiated. Routine 18 branches and links to the second entry 41 when it is been determined that an initial candidate within a DD entry is to be chosen. Routine 18 passes to the second entry the appropriate address of the TIOT DD entry. Balancer 19 then returns to routine 18 the device entry in the TIOT corresponding to the "best" candidate.

Routine 18 branches to the third entry if the DADSM routine fails to obtain space for the current "-best" candidate. The third entry subroutine will then select the "next" best candidate from the remaining available candidates and passes this information back to space request 18. Routine 18 branches and links to the fourth entry after space is successfully obtained on the current "best" candidate. Balancer 19 then updates the DADTBL to reflect the anticipated load of the request just allocated. Thereafter, control is returned to 18 and the interaction of 18 and 19 with entries 41–43 continues until all space requests have been satisfied.

The details of FIG. 2 will now be described in connection with each of the entry points.

First Entry

The general functions of the first entry subroutine are to perform the housekeeping and initialization functions, described below, including receiving parameters from routine 18, zeroing variable work areas in load balancing tables that reside permanently in core, setting local pointers for non-local tables in variables, issuing the time macro, calculating time since the last execution of balancer routine 19, and updating the time of last allocation.

Upon first entry 40 into load balancer 19, a series of initializing steps 44–50 are performed. Step 44 zeroes those fields within routine 19 that renders routine 19 a serially reuseable process and includes zeroing WORKTABLE2–6 and DADTBL1–6. Step 45 zeroes the entries in PCTBL. As described elsewhere, the PCTBL is a work area that includes one entry for every physical selector channel in the system, the entries being in order to conform to the channel numbering system used by IOS 34. Each entry is used to accumulate all data required by routine 19 which is associated with a physical channel.

Step 46 zeroes the index to the best physical channel, OCTBL3, to permit a new entry to be made there during the course of routine 19. In steps 47 and 48, pointers in routine 19 are first set to address the first TATBL in the chain. Thus, in the example shown in FIG. 1, the address of TATBL 22 would be inserted into routine 19, TATBL 21 not being in existence at that time. Then, a pointer to the first DD entry in the first TATBL is set and the number (WORKTABLES) of tasks doing I/O activity is incremented by one to account for the current task undergoing the allocation routine. Step 49 initializes the TATBL device entry pointer. Step 50 is an important step and it obtains the time interval since the last allocation routine and updates the time area. This is done by obtaining the current time from the system clock through time supervisor 30 and subtracting from it the time of the last allocation (WORKTABLE1), the difference being the time interval (WORKTABLE2) between allocations. The current time stamp is then placed within the time of last allocation field to update it for the current allocation routine. This interval of time between two successive step allocations is hereafter called the "measurement or time interval." Before proceeding with further discussion of the flowchart, we will now proceed to discuss the reasons for using this particular measurement interval. The utilization of all asynchronous I/O resources is hereafter referred to as utilization distribution "UD." The particular system for which the invention is designed assumes a multi-programming environment. At the time allocation is taking place for a future task, some number of other current tasks are concurrently executing and utilizing the I/O subsystem. If we assume that a total of $n$ tasks are currently executing and that the step being allocated has average I/O requirements, then we can reasonably anticipate when the present step is attached, it will account for only one/$n^{th}$ of the total I/O utilization. In other words, the total utilization is represented by a relatively large ongoing component due to the currently executing tasks and a smaller component due to the step being initiated. The anticipated UD, i.e., what the UD is expected to be after the task being initiated becomes attached, is then viewed as consisting of two distinct components, the current component contributed by currently executing tasks and the pending component contributed by the step currently undergoing initiation.

The objective of the measurement and analysis processes are to extrapolate what the I/I utilization will be sometime in the near future. What is needed is a representative average of the utilization of each I/O resource taken over some time interval. Obviously, one end point of the time interval should be as close to the point in time when the measurement will be used. This means that the one end of the measurement interval will occur during the execution of the I/O device allocation routine. However, the problem remains as to what the starting point should be of this interval. If the interval is too short, there is a chance that some utilization patterns will be excluded. On the other hand, if the interval is too long, there is a lesser possibility that, due to chance or normal irregularities in the process, some significant source of utilization may either go unnoticed or overrepresented. Consequently, it was decided that the preferred measurement interval is that time that elapses between two successive step allocations. Adjustments can be made in the UD for data sets that have been opened and closed during the interval, in a manner more described hereafter.

Returning now to FIG. 2A, and beginning with step 51, the next series of steps gathers information from each DD entry in the chain of TATBLs to account for the current utilization components and to factor, into the PCTBL, LCTBL and DADTBL, information about the current load. Step 51 initially decides for the first DD entry in the first TATBL in the chain whether or not the DD is open by looking at the open bit (TATBL4). In step 52, the seen bit (TATBL5) is looked at to determine whether or not the DD was opened since the last allocation. If the seen bit was on, then step 52 results in a negative decision which then proceeds in step 53 to call PROCECO4. This subroutine accumulates the EXCP rate and channel utilization in a manner fully described hereafter. Inasmuch as there can be more than one device for each DD, step 54 then makes the decision whether or not the device just looked at was the last one. If not, step 55 bumps the TATBL pointer to point to the next device and a branch is then taken back to step 53 to repeat the process. If it was the last device, then step 56 decides whether or not the end of the TATBL being scanned was reached. If the end was not reached, then step 57 bumps the pointer to the next TATBL entry and a branch is made back to step 49. The process will continue until the end of the TATBL is reached whereupon step 58 decides whether or not the end of the TATBL chain has been reached. If not, step 59 obtains the address of the next TATBL and a branch is then made back to step 48. The process will be repeated until the end of chain of TATBLs is reached whereupon a branch is taken to step 60 (FIG. 2D).

In FIG. 2A, if the decision of step 51 is that the DD is not open, a decision step 62 determines whether the DD was the result of the last allocation. If "yes," then step 63 marks the seen bit of the appropriate TATBL DD entry. Then, step 65 determines whether the DD was ever open. When "yes," a branch is made to step 69 with the result that the particular data set status is ignored as it has no predictable value in connection with any current component due thereto. If not, a branch is taken to step 66 (FIG. 2B) to consider whether or not the device is a DASD or TAPE. If it is a DASD device, step 67 increments the number of allocated but not open data sets on the device in DADTBL. If it is not a DASD, that is, it is a tape unit, then step 68 increments the number of allocated unopened data sets on the associated logical channel entry in LCTBL. Tape units are treated as a group and there are no device entries for individual units. Step 69 follows both steps 67 and 68 and it zeroes the device EXCP count in TATBL12. Step 70 then considers whether or not this was the last device entry for the unopen DD and, if not, step 71 bumps the pointer to the next TATBL device entry and step 69 and following steps are repeated. After the end of the last entry, step 70 branches to step 56 previously discussed.

Referring back to step 62 (FIG. 2A), if the DD was not the result of the last allocation, or if in step 65, the DD was opened, then a branch is taken to step 69 (FIG. 2B) for zeroing the device EXCP count and continuing the process from there.

If in step 52 (FIG. 2A), it was decided that the DD was open since the last allocation, then a branch is taken to step 74 (FIG. 2C) which marks the TATBL DD entry as seen for use by some later initiator. Then, step 75 calculates the period in which the DD was open. When a DD is open, a time stamp is made thereof and this calculation of step 75 is simply made by subtracting that time stamp from the current time. Thereafter, step 76 obtains the utilization conversion factor from DDTBL1 and places it in the TATBL13.

Step 78 then considers whether or not this was the last device entry for the particular DD and a MLTDVSW switch is either set to zero or one in accordance with a "yes" "no" decision from step 78. This switch is used to insure the correct handling of multiple devices in DD entries. Thereafter, step 81 considers whether or not enough EXCP's have been issued to the particular data set and this is done by determining whether or not the DD was open for a period of time greater than one second. If it has been, then it is assumed that enough EXCP's have been issued and if not, the negative decision is made from step 81. From step 81, if the decision is "yes," step 83 calls PROCECO4 (FIG. 2G) to accumulate the EXCP rate and channel utilization. Steps 84 and 85 thereupon cause step 81 and subsequent processes to be repeated until the last device entry is reached whereupon step 84 branches to step 56 previously described. In step 81, if the decision is "no," then step 86 zeroes the EXCP count for this device entry in the TATBL. Step 87 then tests the state of MLTDVSW switch and if it is not zero, a branch is taken to step 84. If it is zero, steps 88 and 89 or 90 are performed, similar to steps 66, 67 and 68 and then a branch is taken back to step 84.

After all the information pertaining to the current component has been factored into the tables, then step 60 (FIG. 2D) proceeds to account for the pending component by first obtaining the address of the first TIOT DD entry. Steps 93–97 proceed to step through each of the DD entries in the TIOT to determine whether the request is for a non-specific volume (step 94). If a request is for a non-specific volume, then step 97 merely bumps the pointer to consider the next TIOT DD entry. If it is not for a non-specific volume, then steps 95 and 96 respectively call UCBTTRO8 and UPABN009 (FIG. 2I) to first calculate the UCB address and then to increment the field of number of allocated but not open data sets in the appropriate entry in DADTBL for direct access devices. For tapes, an entry is made in the LCTBL.

Note in connection with step 60 that TIOT DD entries are scanned from the very beginning including those on which a decision has already been made so that steps 95 and 96 are primarily directed to considering the pending component factor relative thereto.

Referring to FIG. 2D, a series of steps are performed to estimate the pending component of the anticipated UD. Step 98 decides whether there are any open data sets and current tasks associated with concurrently executing tasks. If there are none (WORKTABLE FIELDS 4 and 5 = 0), then a branch is taken to step 101 which defaults the load or anticipated EXCP rate to 1. Step 101 will also default the anticipated rate to 1 if the rate from step 100 is less than 1. From step 98, if there are open data sets and current tasks, then step 100 calculates the anticipated EXCP rate to be used by the load balancing algorithm for the step undergoing allocation as follows. First, an average EXCP rate per open data set is determined by dividing the total EXCP rate of all currently open data sets by the total number of open data sets as seen by PROCECO4 (fields 3 and 4 of WORKTABLE). Second, the average EXCP rate per task is determined by dividing the total EXCP rate of all currently open data sets by the total number of tasks currently doing I/O (fields 3 and 5 of WORKTABLE). This resultant rate is then further divided by the total number of DD entries in the current TIOT to provide an estimated rate for each of the DD entries. Third, the results of the first two steps are then averaged to provide the anticipated data set EXCP rate. The reason for using this mode of estimation will now be discussed.

The pending component of the anticipated UD is defined to be that portion of the total anticipated UD contributed by the step currently being initiated. The most conspicuous difference between the pending component and the current component is that there is no I/O event rate measurement by which to estimate the anticipated UD. There are also two related problems: First, estimating what proportion of the total anticipated UD the pending component will contribute; and second, estimating the relative utilization potentials of the various data sets that will be accessed as part of the pending component. In the previous discussion of the relative significance of the current component versus the pending component, it was concluded that the best available estimate considered the total number of executing tasks currently utilizing I/O resources. This suggests that the level of multi-programming is a key variable in determining whether the step being initiated will have a large or small impact on the total anticipated UD. One approach to solving the first problem mentioned above would be to divide the I/O event rate associated with the entire current utilization by the number of current tasks using the I/O resources to obtain an average task event rate and to use this figure to estimate the I/O event rate for the step being initiated. This value could then be divided by the number of data sets defined in the step to obtain an estimated I/O event rate for each data set to be allocated. The one drawback with this is the assumption that the step to be initiated will have the same total anticipated I/O event rate regardless of how many data sets it accesses.

Another approach is based on the premise that the steps anticipated I/O event rate will be proportional to the number of data sets it accesses. Thus, instead of dividing the I/O event rate for the entire current utilization by the level of programming, the figure is instead divided by the total number of currently open data sets to obtain an average I/O event rate for each data set allocated to the step being initiated. This approach however may go too far because it is doubtful that the amount of I/O associated with any task is directly proportional to the number of data sets accessed. Because of the difficulties with each of these approaches, the best solution appears to use a value between the values obtained by both approaches and so the method described above was adopted.

Step 103 involves calculating the anticipated utilization (DDTBL4) for each device type and this would be done for each entry in the DDTBL. For each device type, the anticipated EXCP rate is multiplied by the average control unit utilization (milliseconds) (DDTBL1) due to one access by the particular device type in question. Next, step 104 calculates the anticipated utilization of all allocated but not open tape data sets on all channels and updates PCTBL accordingly. This calculation is done by simply multiplying the number of all allocated but not open tape data sets on a given channel (LCTBL1) by the anticipated utilization calculated in step 103.

The next series of steps 105–111 is performed for each entry within the DADTBL and afterwards control is returned to space request 18. These steps complete the processing associated with the first entry into load balancer 19. Step 105 calculates the anticipated channel connect utilization by adding the utilization (DADTBL4) due to currently open data sets, the utilization due to data sets already allocated to the device but not open, (DADTBL6 times DDTBL2) and the anticipated utilization of the DD request (DDTBL2) about to be satisfied. The result is placed in DADTBL4 as an update. Step 106 calls UPCTUT15 to update the channel utilization in the PCTBL.

Next, 107 calculates the anticipated EXCP rate and puts in the total EXCP rate for device field of the associated entry in DADTBL. This calculation is performed by adding the existing total EXCP rate, the product of the anticipated rate from step 100 times the sum of the number (DADTBL6) of allocated but not open data sets plus one. This "one" factor accounts for the data set of the step currently undergoing allocation.

Steps 108 determines whether the current EXCP rate (DADTBL1) exceeds the old rate (DADTBL2). If it does, step 109 updates the old rate. After step 109 and step 108, if the anticipated EXCP rate does not exceed the old rate, step 110 calls SSKUT17 to calculate the device standalone seek utilization and put the value in DADTBL3.

Second Entry

The second entry to balancer 19 is entered each time a space request in the step undergoing allocation is initially considered.

Figure 2E:
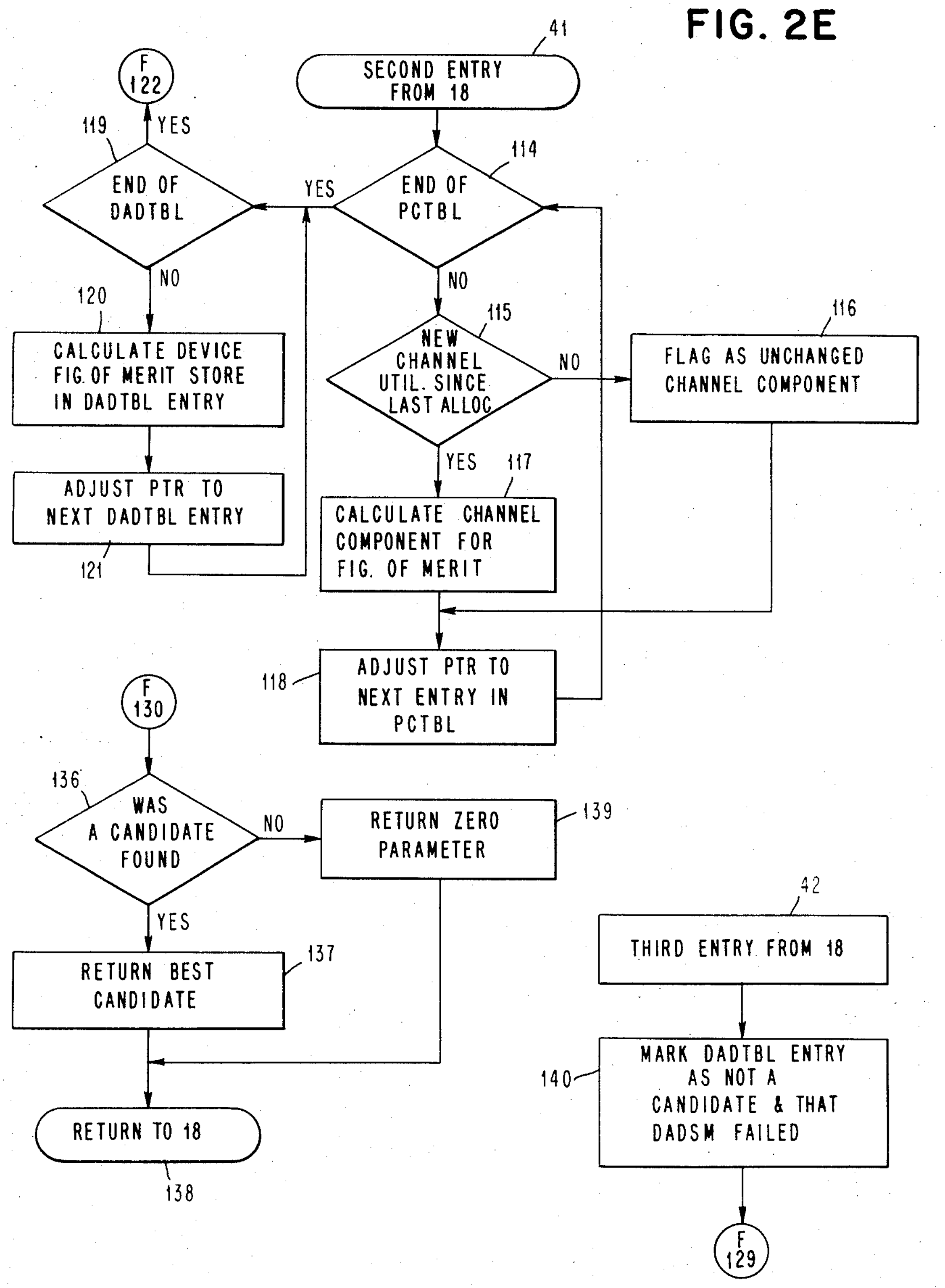
Figure 2F:
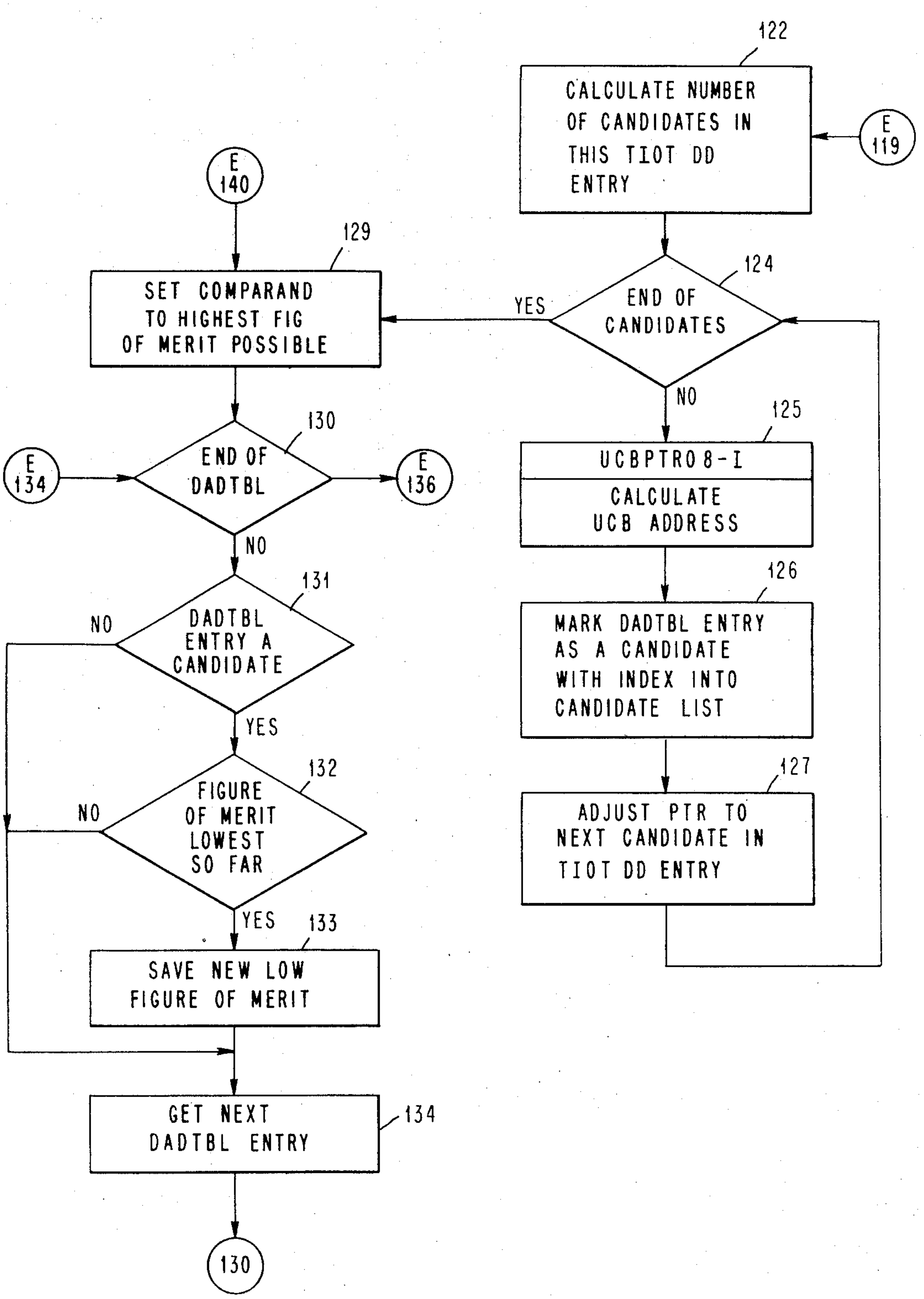
Figure 2G:
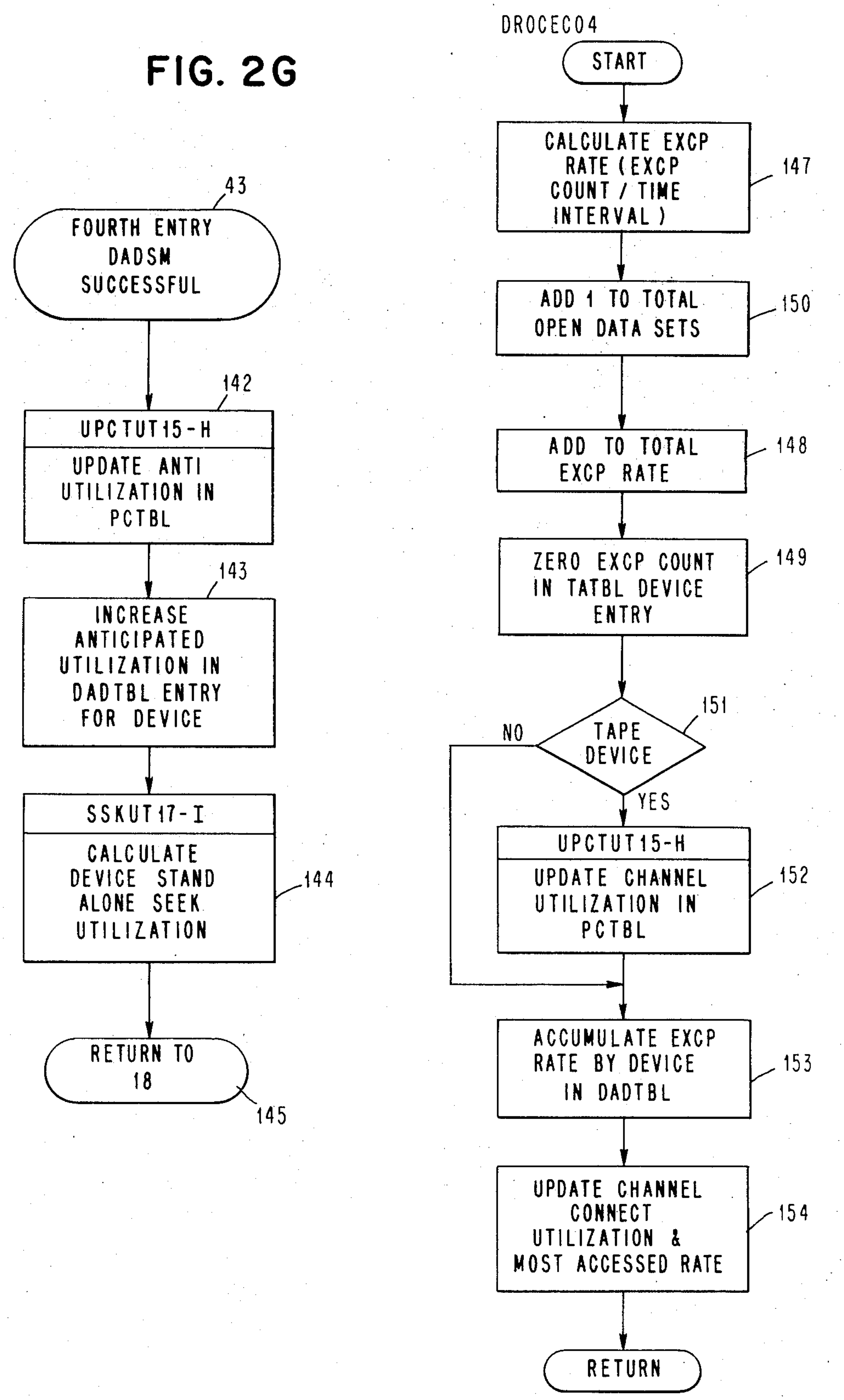
Figure 2H:
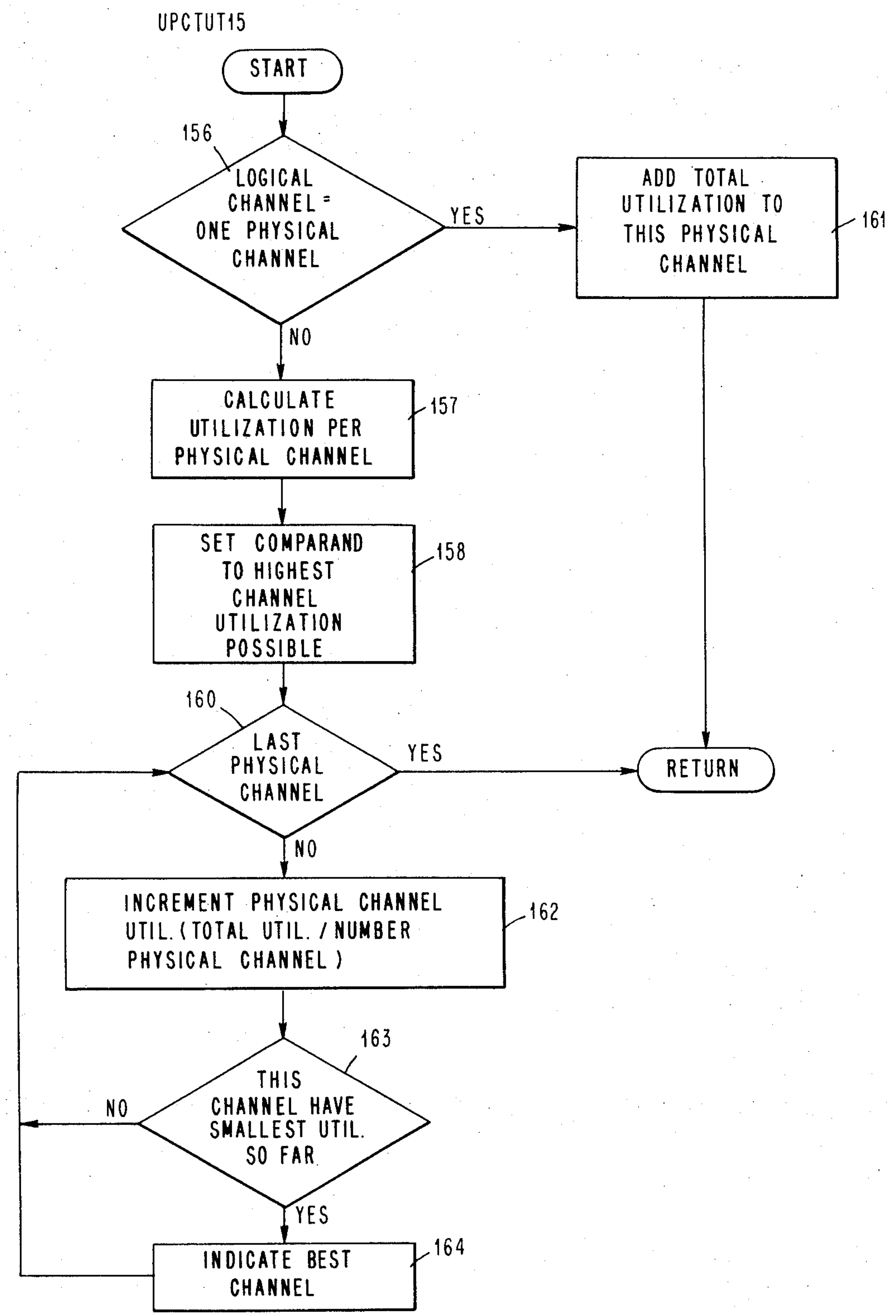
Figure 2I:
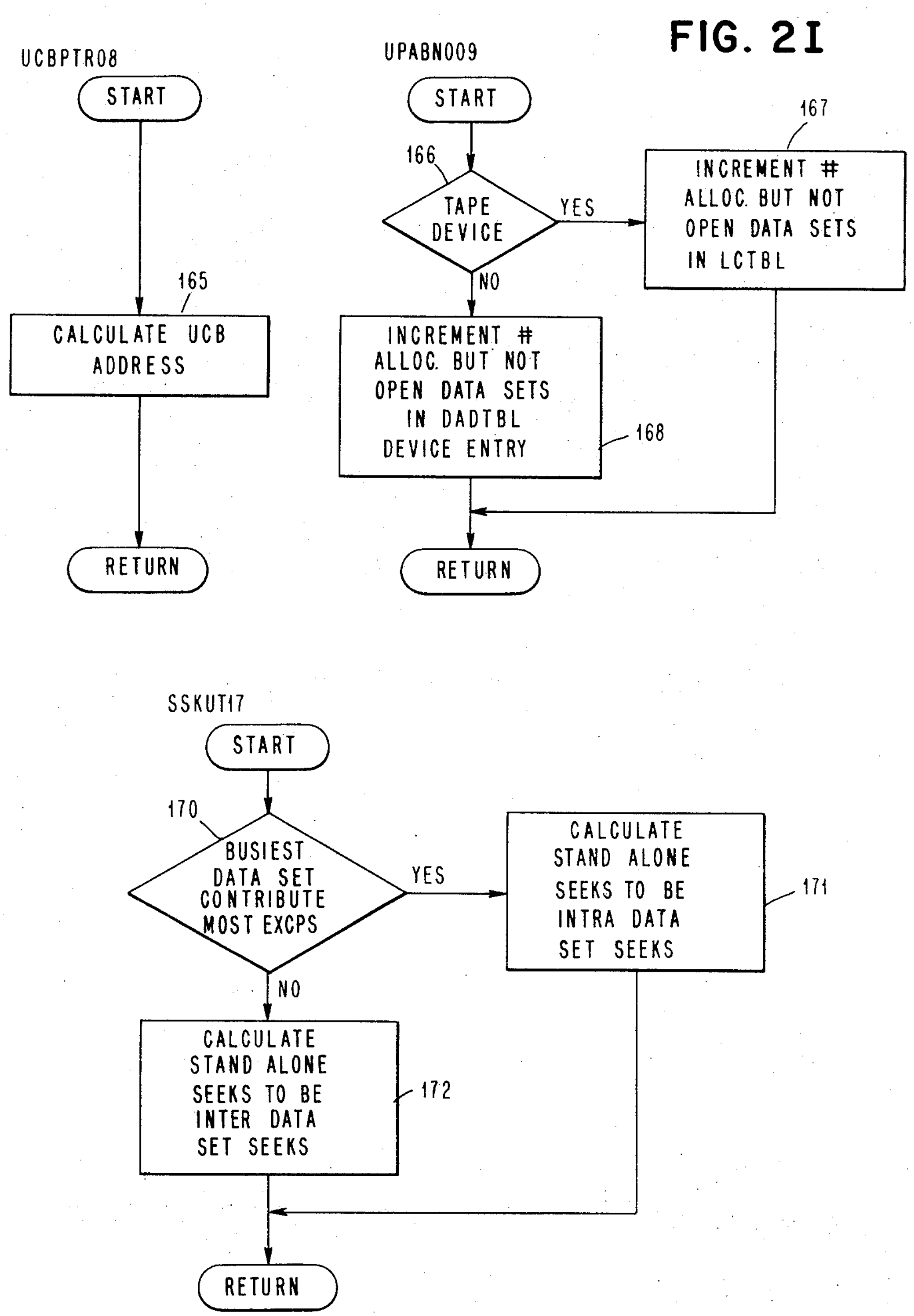

Referring now to FIGS. 2E and 2F, after second entry 41, a series of steps 114–118 are performed by stepping through the channel entries in the PCTBL and calculating a new channel component (PCTBL3) for the figure of merit if the channel connect utilization was modified by satisfying the previous space request in the current step (PCTBL3 different from PCTBL4). This condition will usually exist for the initial iteration through the routine because PCTBL4 will always be zero. At the completion of this, a branch is made to perform a series of steps 119–121, the purpose of which is to step through each entry in the DADTBL and calculate the device figure of merit (DADTBL5). The calculation of the figure of merit in steps 117 and 120 is discussed below.

When the end of DADTBL is reached, a branch is taken to step 122 which calculates the number of candidates in the TIOT DD entry. Thereafter, steps 124–127 scan this list of candidates. Step 125 called UCBPTR08 to calculate the UCB address associated with each candidate. Access to the UCB provides an index into the corresponding entry in the DADTBL. Then, step 126 marks the thus located entry (DADTBL6) as a candidate and provides it with a list or index into the candidate list. Step 127 is then adjusted to the next candidate in the TIOT DD entry. The process continues until the end of the candidate list is reached.

Thereupon, the highest possible figure of merit is placed in step 129 as a comparand. Steps 130–134 then proceed to step through each entry in the DADTBL. Step 131 determines whether or not the entry is a candidate. If not, step 134 gets the next entry and if so, a comparison is made of the corresponding figure of merit, in step 132, with the comparand of step 139 to determine whether or not the new figure of merit is lowest so far. If not, the next DDTBL entry is scanned. If so, step 133 saves the new low figure of merit and establishes it as the comparand. When the end of the entries in DADTBL is reached, step 136 determines whether or not a candidate was found. If not, step 139 returns a zero parameter. Otherwise, step 137 returns an indication of the "best" candidate. Thereafter, step 138 returns control to the space request 18.

In calculating the figure of merit, the objective is to maximize total I/O component utilization. To account for the possibility that the best candidate may not be on the least utilized channel, it is necessary to combine channel and device considerations into a single figure of merit. The lower the figure, the more favorable is the device. To do this, the formulation includes a device component reflecting only the significance of the device, a channel component reflecting the significance of the channel, and a proportionality constant, derived by trial and error, for giving weight to the channel component proportional to its importance as a resource on which many devices are dependent. Channel boundedness which measures the extent to which the unavailability of one or more channels impedes task execution, seems to increase as the square of channel utilization. Thus, the channel figure of merit is calculated by squaring the channel utilization (PCTBL1) and dividing the product by the number of numerical units providing for 100 percent utilization. This product representing the channel boundedness is then multiplied by the proportionality constant of 7 which is the preferred figure derived by trial and error. The resultant product then represents the channel component of the figure of merit and is placed in PCTBL2. The device figure of merit is simply the sum of the channel figure of merit from PCTBL3 and the standalone seek utilization and channel connect utilization (DADTBL 3 and 4).

Third Entry

The third entry 42 to load balancer 19 from space request routine 18 occurs as a result of the DADSM (direct access device system management) indicating that the initial candidate was not acceptable. Thus, in step 140, the DADTBL entry corresponding to that device is marked as "not a candidate" and then a branch is taken to step 129 described previously in connection with the second entry. Steps 129 through 139 are performed in the manner previously described and eventually return control to 18 along with an indication of the "next best" candidate or "zero" indicating that no further candidates are available.

Fourth Entry

In step 43, FIG. 2G, the fourth entry to balancer 19 occurs after the DADSM successfully obtained space on the candidate device. Thereafter, steps 142–144 update the utilization information due to this device and returns to 18 in step 145. Step 142, UPCTUT15 is called to update the anticipated utilization due to the data set just allocated in the PCTBL. Step 143 increases channel connect (DADTBL4) by the anticipated utilization for the device. Step 144 calls SSKUT17 to recalculate the standalone seek utilization.

Subroutines

The various subroutines called in balancer 19, as previously described, will now be explained:

PROCEC04 (FIG. 2G) Step 147 calculates the EXCP rate by dividing the EXCP count (TATBL12) by the length of the measurement interval (WORKTABLE2). Next, the EXCP rate is added in 148 to the total EXCP rate in WORKTABLE3. Step 149 zeroes the EXCP count in the TATBL device entry for accumulation of new counts as they occur during the next measurement interval. Step 150 adds a one to the total number of open data sets in WORKTABLE4. In steps 151 and 152, if the device is a tape device, then UPCTUT15 is called to update the channel utilization in the PCTBL. If it is not a tape device, that is, it is a direct access device, step 152 is skipped. Thereafter, step 153 accumulates the EXCP rate by device in the DADTBL1. That is, the rate from step 147 is added to that which already exists. Thereafter, step 154 updates the rate of most accessed data set and channel connect utilization (DADTBL2,4) for the device to end the routine.

In summary, PROCEC04 is used to process the EXCP count in the DADTBL device entry. This count is divided by the time the data set has been opened to obtain the EXCP rate. This rate is added to an accumulated total for all open data sets. If the device is a tape unit, treated as a group, there is no interest in recording the device data and so no estimate is made here of the tape data set utilization. If the device is a direct access device, the EXCP rate is multiplied by a conversion factor to get the utilization and this figure along with the EXCP rate are used to update the accumulated counts in the DADTBL entry. Also, the EXCP count field in the TATBL device entry is zeroed.

UPCTUT15 (FIG. 2H) - The general purpose of this routine is to update the physical channel utilization totals in the PCTBL when utilization increment (EXCP rate times conversion factor) occurs for a logical channel, and to determine which physical channel belonging to a logical channel then has the smallest total utilization or is the "best" physical channel. Step 156 checks whether the logical channel equals one physical channel and if so, step 161 adds the utilization increment, passed by the calling routine, to the total utilization for the physical channel PCTBL1 and then returns. If not, then step 157 calculates the utilization for the physical channel. A comparand is then set to the highest channel utilization possible in step 158 and steps 162–164 then proceed to add the result of 157 to field 1 in each entry in PCTBL, to determine which channel has the smallest utilization, and provide an indication in LCTBL3 thereof.

UCBPTR08 (FIG. 2I) This subroutine involves calculating the UCB address using information derived from the prior art control tables in a manner known to the art.

UPABNO09 The purpose of this subroutine is to reflect the anticipated effect of an allocated but not open data set indicated in a TIOT by incrementing a count of the number of such data sets in the appropriate LCTBL entry for tapes, via step 167, or in the DADTBL entry, for direct access devices, by step 168. Preceding these steps, the appropriate selection is made by step 166.

SSKUT17 (FIG. 2I) The general purpose of this routine is to calculate the standalone seek utilization for one device. When an I/O request is directed to a fixed head device, such as a drum, any delay that the request encounters will be caused by the channel being busy. But an I/O request directed to a moveable head device, such as a disk drive, may find the channel to the device free but that the device itself is busy executing a standalone seek, that is, positioning the heads. The time required to position the heads is dependent on how far the access mechanism must move. The movement occurs asynchronously with respect to any channel. Thus, the channel or channels are free to handle other requests on other devices while standalone seeks are occurring. When circumstances prohibit a high degree of standalone seek/channel busy overlap, the channel and most likely the CPU will frequently have to wait for the completion of one or more of the standalone seeks. When this occurs, the system can be considered device bound rather than channel bound. Existence of this relationship makes it important to balance the utilization distribution between all moveable head devices on a channel.

Another problem in considering this factor is that the simple utilization may be a very poor approximation of the moveable head device total utilization because it does not account for the possibility of variable length standalone seeks. All standalone seeks directed to a single moveable head device can be categorized as either inter or intra data set seeks. Because the positioning of data sets in a volume tends to be random, the average length of an inter data set seek coincides with the published average access characteristics for the device in question. The average length of an intra data set seek would be much shorter and a practical average for this is empiracally derived by measuring a large sample of applications. The further problem here is the relative percentages of inter and intra data sets seeks.

With these considerations in mind, step 170 estimates whether the busiest data set contributes the most EXCP's. This is done by subtracting the EXCP rate of the most accessed data set (DADTBL2) from the total EXCP rate for device (DADTBL1). If the difference is greater than the EXCP rate of the most accessed data set, then the estimate is made that all seeks are expected to be inter data sets. In this case, then step 172 calculates the standalone seek utilization accordingly. This is done by multiplying the total EXCP rate for device (DADTBL1) times the average device utilization due to one inter data set standalone seek (DDTBL3). If the difference between the total EXCP rate and the most accessed data set is not greater than the EXCP rate of the most accessed data set, step 171 calculates the standalone seek utilization on a basis of a combination of intra and inter data set seeks. This calculation is done by doubling the difference between the total EXCP rate for device and the EXCP rate of the most accessed data set. This doubled difference is then multiplied by the average device utilization due to one inter data set standalone seek (DDTBL3) and added to the product of the average device utilization due to one intra data set standalone seek (DDTBL4) times the difference between the total EXCP for the device and the doubled difference. For both calculations, if the standalone seek utilization calculated is greater than full utilization of the device, the value defaults to that associated with full utilization.

While the invention has been particularly shown and described with reference to a preferred embodiment thereof, it will be understood by those skilled in the art that various changes in form and detail may be made therein without departing from the spirit and scope of the invention.

What is claimed is:

1. The method of balancing I/O activity in a data processing system having an operating system for controlling the operation of said system whereby a plurality of tasks are concurrently executed, said operating system including a task allocation procedure for allocating data sets to I/O devices in accordance with the requirements of the respective tasks, comprising the steps of:

a. machine estimating I/O utilization due to tasks currently executing;

b. machine estimating I/O utilization due to a task undergoing allocation;

c. and allocating a data set to the I/O device having the least utilization based on the utilization estimates from said prior steps.

2. The method of claim 1 wherein step (a) comprises the step of:

counting the number of I/O events that occur in a predetermined time interval, relative to the respective I/O devices in said system being utilized by said currently executing tasks.

3. The method of claim 2 wherein:

said time interval ends with the time at which said task allocating procedure occurs for the task currently undergoing allocation.

4. The method of claim 3 wherein:

said time interval begins when the most recently allocated task underwent allocation, whereby said time interval is that which elapses between successive allocations of different tasks.

5. The method of claim 2 wherein said operating system includes an input/output supervisor for controlling the accessing of data sets on I/O devices, and wherein said I/O events being counted are the number of times said input/output supervisor is invoked for accessing said data sets.

6. The method of claim 1 comprising the steps of:

d. constructing in said system a task activity table that includes an entry for each I/O device to which each data set associated with a task is allocated, each said entry including a count field;

e. incrementing said count field during the course of executing the task associated therewith, each time a data set allocated to said associated device, is accessed.

7. The method of claim 6 wherein:

step (d) is performed during each task allocation so as to create a chain of said tables, and step (d) includes adding said table constructed thereby to said chain.

8. In a data processing system having a plurality of auxiliary storage I/O devices for storing data sets used in the concurrent execution of a plurality of problem program tasks, said data sets being allocated to said devices during allocation of each task and being accessed by opening thereof during execution of the associated problem program task, the method of balancing I/O activity comprising the steps of:

a. counting the number of I/O events on each device connected with open data sets thereon;

b. defining during the allocation of data sets of each task the distribution on said devices of data sets which will start to load said devices but which as of allocation have not yet started to load said devices;

c. calculating the anticipated loads on said devices based on said events associated with said open data sets and on said data set distribution;

d. and allocating data sets to said devices based on the lowest anticipated loads as calculated by said last step.

9. The method of claim 8 wherein said system includes an operating system having an input/output supervisor invokable by problem program tasks to access data sets, and said I/O events being counted are the number of times said input/output supervisor is so invoked.

10. The method of claim 8 comprising the steps of:

e. creating after all data sets of each task have been allocated, a task activity table including an entry for each device to which the associated data sets are allocated, each entry including a count field for accumulating the count of I/O events due to said associated task on said associated device;

f. chaining said table to similar tables previously created;

g. and incrementing said associated count field upon the occurrence of the I/O event due to the associated task.

11. The method of claim 10 comprising the steps of:

h. maintaining within said system a device table including one entry for each device in the system, each entry including a field for accumulating data based on said I/O events associated therewith;

step (e) including creating in each entry an indication of whether the associated data set is open or closed;

i. setting, in response to opening a data set by a problem program task, said indication to open;

and step (c) involves sequencing through said chain of activity tables and for open data sets indicated therein, accumulating in the appropriate field of said device table, data derived from said counting of I/O events associated therewith.

12. The method of claim 8 wherein step (b) includes:

the distribution of data sets which were allocated by a prior task allocation but which are unopen at the time of the current allocation, and further includes data sets that have already been allocated by the current allocation.

13. The method of claim 8 wherein step (a) involves counting said I/O events which occur during a predefined time interval which interval ends at the time of current allocation.

14. The method of claim 13 wherein step (a) further involves counting said I/O events for data sets which have been open for a period less than said time interval but greater than a minimum predetermined period.

15. The method of claim 14 wherein:

data sets which are open for less than said minimum period are treated as in step (c) on the basis of their distribution rather than on the basis of any count of I/O events.

16. The method of claim 8 wherein:

said counting in step (a) occurs during a predetermined time interval;

and step (c) includes calculating an I/O event rate for each device by dividing the number of I/O events by the length of said time interval.

17. The method of claim 16 wherein step (c) comprises:

adding two factors one of which is a device component representing usage of such device and the other of which is a channel component representing usage of the channel to which the device is connected.

18. The method of claim 17 wherein each of said components includes a first factor indicative of current load and derived from said I/O event rate, and a second factor indicative of pending load and based on said distribution of data sets.

19. The method of claim 18 wherein:

said first factor is obtained by multiplying said I/O event rate for each device by a device-dependent conversion factor representing average access time.

20. The method of claim 17 wherein:

said device component comprises, in the case of an I/O disk drive having a moveable head, a sub-component accounting for standalone seeks during positioning of said head

21. The method of claim 20 wherein:

said sub-component is dependent on an estimate of whether the anticipated seeks will be dominantly interdata-set seeks or intra-data-set seeks.

22. In a data processing system having an operating system operative to initiate individual job steps and to allocate data sets requested by control statements defining said job steps, said operating system being further operative to control the concurrent execution of multiple tasks during execution of said job steps, the method carried out in said system of balancing operation of the data processing system's I/O subsystem to optimize the utilization of I/O devices and channels comprising the steps of:

a. identifying during the process of allocating a data set to an I/O device, those I/O devices to which such data sets can be allocated;

b. determining during allocation of a job step current utilization distribution in said I/O subsystem due to currently executing tasks by counting relative to each I/O device the number of times it has been used over a predefined period of time immediately preceeding such allocation;

c. determining during allocation of a job step the anticipated utilization distribution in said I/O subsystem which is expected to result from execution of such job step;

d. combining the results of steps (b) and (c) to define the total utilization distribution;

e. specifying which of said I/O devices identified in step (a) has the least individual total utilization;

f. and allocating a data set of the job step being initiated, to the device specified by step (e).

23. The method of claim 22 comprising the further step of:

adjusting the anticipated utilization distribution each time a data set is allocated to a device to account for the utilization expected to result therefrom.

* * * * *